United States Patent
Kijima et al.

(10) Patent No.: US 6,812,965 B1
(45) Date of Patent: Nov. 2, 2004

(54) IMAGING APPARATUS WITH DETECTORS FOR JUDGING THE OPERATING CONDITION OF THE APPARATUS

(75) Inventors: Takayuki Kijima, Akiruno (JP); Masataka Ide, Hachioji (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/346,962

(22) Filed: Jul. 2, 1999

(30) Foreign Application Priority Data

Mar. 7, 1998 (JP) .......................................... 10-188891

(51) Int. Cl.⁷ .......................... H04N 3/14; H04N 5/235
(52) U.S. Cl. ...................................... 348/312; 348/362
(58) Field of Search ................................ 348/244, 366, 348/230.1

(56) References Cited

U.S. PATENT DOCUMENTS

| | | | | |
|---|---|---|---|---|
| 4,210,394 A | * | 7/1980 | Sato et al. .................... 396/231 |
| 4,599,657 A | * | 7/1986 | Kinoshita et al. ............ 386/117 |
| 4,763,155 A | * | 8/1988 | Oda et al. .................... 396/235 |
| 4,984,002 A | * | 1/1991 | Kokubo ........................ 348/296 |
| 5,049,996 A | * | 9/1991 | Kaneko et al. ............. 348/230.1 |
| 5,153,732 A | * | 10/1992 | Oda et al. .................... 348/243 |
| 5,162,836 A | * | 11/1992 | Ishimaru ..................... 396/231 |
| 5,220,376 A | * | 6/1993 | Tagami et al. ............... 396/235 |
| 5,237,364 A | * | 8/1993 | Tagami et al. ............... 396/235 |
| 5,614,983 A | * | 3/1997 | Iwane et al. .................. 396/97 |
| 5,774,747 A | * | 6/1998 | Ishihara et al. ............... 396/61 |
| 6,292,220 B1 | * | 9/2001 | Ogawa et al. .............. 348/312 |
| 6,445,411 B1 | * | 9/2002 | Shibata et al. .............. 348/213 |

FOREIGN PATENT DOCUMENTS

JP        10-191170        7/1998

* cited by examiner

*Primary Examiner*—Andrew Christensen
*Assistant Examiner*—Tia M. Harris
(74) *Attorney, Agent, or Firm*—Volpe and Koenig, P.C.

(57) ABSTRACT

An imaging apparatus having an imaging element for accumulating signal charge corresponding to an incident scene light flux in a photo-electric converting element section and transferring the accumulated signal charge through a vertical shifter to a horizontal shifter so as to be read out there from, and a shutter for selectively blocking the scene light flux to be incident on the imaging element is moved. The operating condition of the imaging apparatus is judged and the operation timings of the shutter and/or the imaging element are/is controlled on the basis of the judged operating condition. The operating condition judging function judges as the operating condition of the imaging apparatus at least one of the ambient temperature, the posture of the imaging apparatus, the power supply voltage level and the number of times of operation of the shutter.

19 Claims, 13 Drawing Sheets

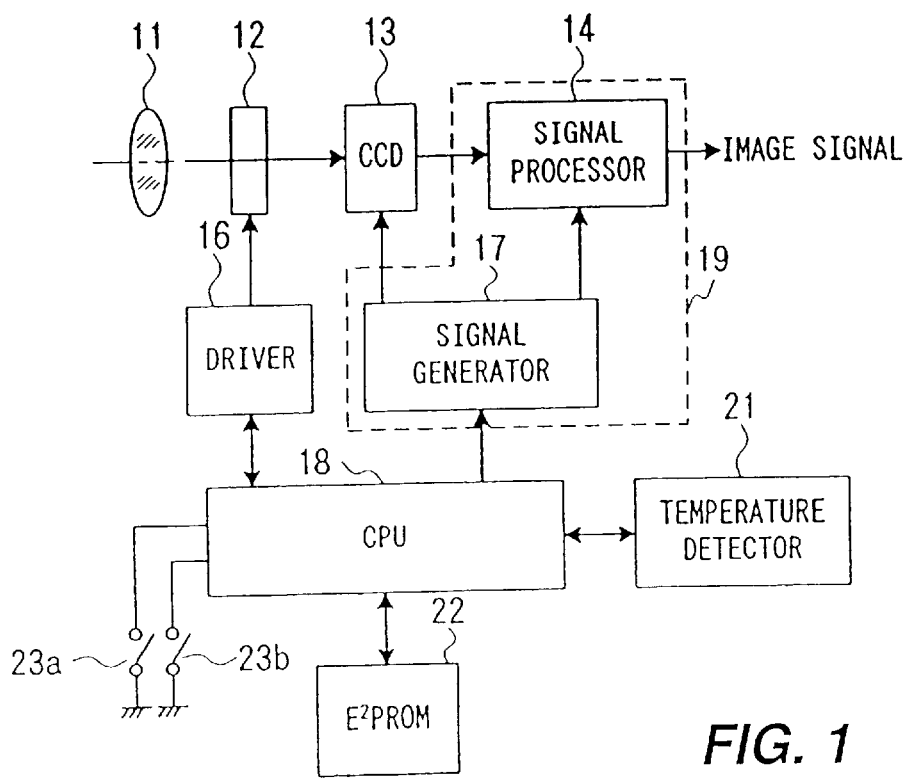
FIG. 1
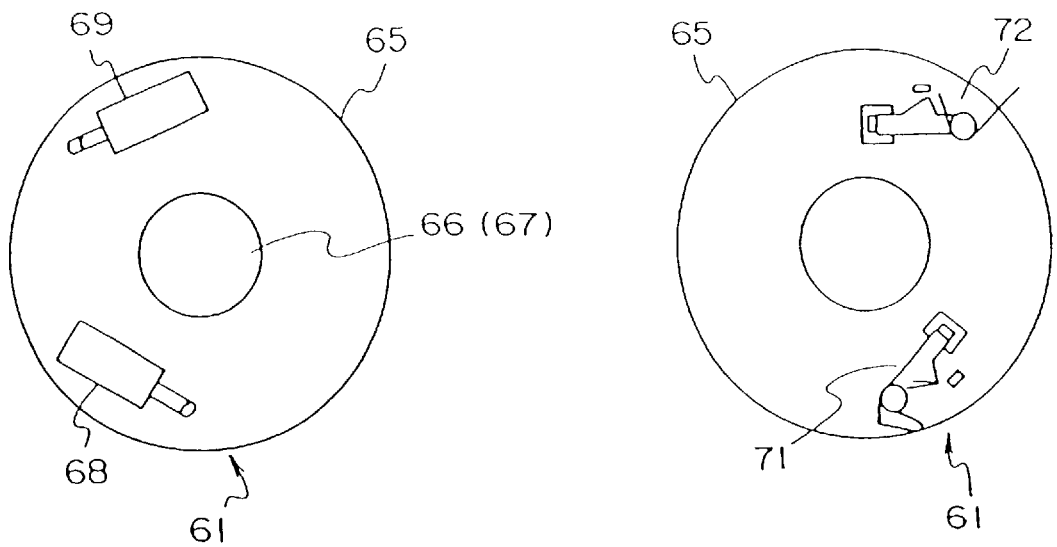
FIG. 3a  FIG. 3b

IMAGING APPARATUS WITH DETECTORS FOR JUDGING THE OPERATING CONDITION OF THE APPARATUS

FIELD OF THE INVENTION

The present invention relates to imaging apparatuses having an imaging element, which are used for electronic still cameras, digital cameras and the like. More particularly, the present invention relates to an imaging apparatus having an imaging element for accumulating signal charge corresponding to an incident scene light flux in a photo-electric converting element section and transferring the accumulated signal charge through a vertical shifter to a horizontal shifter so as to be read out therefrom, and a shutter means for selectively blocking the scene light flux to be incident on the imaging element.

BACKGROUND OF THE INVENTION

Hitherto, various imaging apparatuses have been proposed as a digital still camera and a digital camera. The imaging elements applicable to such imaging apparatuses have also been proposed. Among such imaging elements is an inter-line CCD solid-state imaging element having a vertical overflow drain structure as schematically shown in FIG. 14.

The CCD shown in FIG. 14 comprises a two-dimensional array of photo-diodes 1 arranged in both horizontal and vertical directions and each constituting a photo-electric converting cell for accumulating charge according to light incidence, a plurality of vertical shift registers 3 constituting vertical shift paths for receiving charge accumulated in associated photo-diodes 1 via a transfer gate 2 and progressively vertically shifting the received charge, a horizontal shift register 4 constituting a horizontal shift path for receiving shifted charge from the vertical shift registers 3 and progressively horizontally shifting the received charge, and a signal detector 5 for amplifying the output signal of the horizontal shift register 4 and outputting the amplified signal.

FIG. 15 is a block diagram showing the construction of a prior art imaging apparatus with the CCD shown in FIG. 14. The illustrated imaging apparatus comprises a focusing lens 11, a shutter means 12, a CCD 13, as a signal processor 14, a shutter driver 16, a signal generator 17, and a CPU 18. The focusing lens 11 focuses a light beam of a scene on a light incidence surface of the CCD 13. The shutter means 12 is constituted by, for instance, a mechanical shutter for either passing or blocking the scene light flux. The CCD 13 converts the scene light beam flux having passed through the shutter means 12 to an electric signal. The signal processor 14 performs various processes on the electric signal from the CCD 13 and outputs an image signal thus generated. The shutter driver 16 controls the shutter means 12. The signal generator 17 supplies pulses for controlling the period of charge accumulation in the photo-diodes 1, pulses for driving the vertical shift registers 3 and pulses for driving the horizontal shift register 4 and also supplies pulses for driving the signal processor 14 in synchronism with the CCD 13. The CPU 18 collectively controls circuits including the driver 16 and signal generator 17. The signal processor 14 and the signal generator 17 together constitute a digital signal processor (DSP) 19.

FIG. 16 is a timing chart illustrating a conventional imaging operation in the imaging apparatus shown in FIG. 15. Specifically, the Figure shows a vertical sync signal VD, a transfer gate pulse train TG, a sub-pulse train SUB, a vertical shift register shift pulse train VT, a clamp pulse train CLP, opening/closing operation of the shutter means 12, and a CCD signal, i.e., a signal read out from the CCD 13.

The vertical sync signal VD is a pulse train prescribing a predetermined unit period of time for obtaining a signal representing one image (i.e., one frame image). Here, periods prescribed by the individual pulses are labeled V1, V2, . . . .

The transfer gate pulse train TG consists of pulses for determining the timing of the transfer of charged stored in the photo-diodes 1 to the vertical shift registers 3, and is applied to the transfer gate 2 in synchronism with the vertical sync signal VD. The transfer gate pulses TG corresponding to the periods, V1, V2, . . . of the vertical sync signal VD are labeled TG0, TG1, . . . .

The sub-pulse train SUB consists of pulses for discharging charge generated in the photo-diodes 1 in the vertical direction of the substrate. The charge discharge is done while sub-pulses SUB are outputted. That is, the charge is accumulated in the photo-diodes 1 during periods tb1, tb2, . . . in which the sub-pulses SUB are stopped in the periods V1, V2, . . . of the vertical sync signal VD. Thus, it will be seen that a so-called element shutter is realized, in which the effective exposure time is controlled through control of the charge accumulation period. The charge accumulation time is determined as a result of measurement of light of the scene image with a measuring means (not shown), and it is measured by counting sub-pulses SUB.

The vertical shift register shift pulse train VT consists of pulses for causing progressive shift of charge in the vertical shift registers 3 toward the horizontal shift register 4.

The clamp pulse train CLP consists of pulses for clamping the CCD signal corresponding to an optical black portion of the CCD. By the clamping, the potential level of the image signal is stabilized to hold a stable black level.

The shutter means 12 is normally open, and is closed (light-shuttered or -blocked) when causing the transfer of charge accumulated in the photo-diodes 1 in response to a recording trigger signal. As the recording trigger signal, in the case of a shutter release button (not shown) providing a two-stage trigger signal, that is, in the case when a first trigger pulse is generated in a preparatory stage of lightly depressing the shutter release button for AF locking and a second trigger pulse is generated by further depressing the shutter release button for starting the recording of a still image, the second trigger pulse corresponds to the recording trigger signal.

The CCD signal has time sections to1 and to2 corresponding to optical black portions in the vertical direction and an effective time section intervening as a scene image period between these time sections. Normally the optical black signal is at a higher level than the effective period signal level.

As is seen from the timing chart of FIG. 16, in the prior art imaging apparatus upon generation of a recording trigger signal in, for instance, the period V3, vertical shift register shift pulses VT are continuously outputted during a subsequent time section ta for fast sweep-out of unnecessary charge in the vertical shift registers 3. In the subsequent period V4, the charge is accumulated in the photo-diodes 1 by suspending the application of sub-pulses SUB for a time section tb4 corresponding to the exposure period, which has been determined on the basis of the CCD signal until the recording trigger signal generation. Accordingly, the time section tb4 constitutes an exposure time for one frame image.

In the subsequent period V5, the image obtained by the exposure during the time section tb4 in the period V4 is outputted as signal CCD4, which is outputted as a result of the exposure in response to the recording trigger signal from the signal amplifier 5. Also, in synchronism with the start of the period V5, the shutter driver 16 is caused to drive the shutter means 12 for closing and in the subsequent period v6 the shutter means 12 is opened. The image obtained by exposure as a result of the closing operation of the shutter means 12 in the period V5, is outputted as signal CCD5 in the subsequent period V6. Since the signal CCD5 is obtained while the shutter means is blocking incident light, the signal levels in the optical black portion time sections and the effective period are substantially equal.

As shown above, in the prior art imaging apparatus, fast sweep-out of charge from the vertical shift registers 3 is performed in the period V3. The light-blocking operation of the shutter means 12 is performed so as to cause the charge accumulation in the photo-diodes 1 during the time section tb4 in the period V4, and cause the transfer of the accumulated charge in the subsequent period V5, and the shutter means 12 is opened again in the subsequent period V6.

In the above prior art imaging apparatus, however, a response time tm is required from the start of the closing operation of the shutter means 12 until the perfectly closed state is brought about. In other words, even with the closing operation started at the start of the charge transfer period V5, during the response time tm the light is incident on the CCD 13, resulting in charge generation in the photo-diodes 1. Therefore, particularly in case of a bright scene the charge generated during the response time tm partly enters the vertical shift registers 3 in spite of the charge sweep-out in the vertical direction with sub-pulses SUB. Also, the generated charge remains on the substrate part of the photo-diodes 1, and is shifted by the vertical shift registers 3 after the shutter means 12 has been perfectly closed. Thus, a problem of the superimposition of smear on the intrinsic CCD signal is posed.

To solve the problem noted above, the applicant has earlier proposed an imaging apparatus, which has the structure as shown in FIG. 15, and in which the imaging operation is controlled with timings as shown in FIG. 17 (Japanese Patent Application No. 8-344052). In this imaging apparatus, after the recording trigger pulse generation the fast sweep-out of unnecessary charge in the vertical shift registers 3 is done in a time section tc in synchronism with transfer gate pulse TG3 synchronized to the vertical sync signal VD. The vertical shift register shift pulse VT for the fast sweep-out period tc need not be synchronized to the horizontal blanking period because of the fact that unnecessary charge which is not used as data is swept out.

Transfer gate pulse TG4 prescribes the end instant of the fast sweep-out period tc, and also causes transfer of signal charge having been accumulated during the charge accumulation time section tb4 to the vertical shift registers 3. The timing of generation of the pulse TG4 is fixedly set such that it is earlier than the start of the next period V5 by a predetermined time interval tv, which is determined on the basis of the response time tm of the shutter means 12 and an allowance thereof. The shutter means 12 starts the light-blocking in synchronism with the transfer gate pulse TG4.

Furthermore, the vertical shift of the signal charge transferred to the vertical shift registers 3, is suspended for a predetermined time tv, and the read-out is started by starting the application of vertical shift register shift pulses VT in synchronism with this vertical shift suspension time tv, i.e., with the start of the next period V5. The timing of the start of the charge accumulation time section tb4 after the generation of the recording trigger signal, is determined to be earlier than the timing of generation of the transfer gate pulse TG4 by the charge accumulation time section tb4.

With the imaging apparatus as described, the shutter means 12 can be in the perfectly closed state in the period V5, in which the signal charge accumulated during the charge accumulation time section tb4 in the period V4 is read out. It is thus possible to solve the above problem of smear and obtain high quality image signal.

However, by various researches and investigations conducted by the inventors, it was revealed that the imaging apparatus proposed by the applicant has a problem to be solved as will be described hereinunder.

Specifically, the motion of the shutter means 12 is degraded or slow due to the following:

(1) The shutter means 12 constituted of, for instance, mechanical shutter provides a slow moving operation at low temperature.

(2) The shutter means 12 with posture thereof, that is, directing upward or downward provides a slow moving operation due to increase in friction of moving member of the shutter means 12.

(3) The driving means of the shutter means 12 provides a slow moving operation due to the reduction of the power source (for instance, battery) voltage level.

(4) Deterioration with age provides a slow moving operation. As a result, even if the vertical transfer suspension time tv is set on the basis of the normal response time tm and an allowance thereof, according to the operation conditions such as ambient temperature, posture, power source voltage level, or changes with age, the response time tm' is longer than the vertical transfer suspension time tv as shown in FIG. 17. Accordingly, the shutter means can not perform perfect light-block operation even if the vertical transfer by the vertical shift register transfer pulse VT is started, causing the same problems as in the prior art.

Such a problem is posed not only in the case of constructing the shutter means 12 with a mechanical shutter but also in the case with a liquid crystal shutter. The liquid crystal shutter has a response characteristic which is dependent on temperature and also on applied voltage and also subject to deterioration with age. Therefore, the above problem is posed depending on operating conditions.

SUMMARY OF THE INVENTION

The present invention seeks to solve the above problem, and its object is to provide an imaging apparatus capable of providing a high quality image signal free from smear to be always obtained from the imaging element.

According to a first aspect of the present invention, there is provided an imaging apparatus having an imaging element for accumulating signal charge corresponding to an incident scene light flux in a photo-electric converting element section and transferring the accumulated signal charge through a vertical shifter to a horizontal shifter so as to be read out therefrom, and a shutter means for selectively blocking the scene light flux to be incident on the imaging element, comprising: an operating condition judging means for judging the operating condition of the imaging apparatus; and a control means for controlling the imaging operation according to the output of the operating condition judging means.

The control means controls the timing of reading out the signal charge from the imaging element from the instant of start of the light-blocking operation of the shutter means.

The control means controls a vertical shift suspension time from the instant of start of the light-blocking operation till the instant of start of shifting in the vertical shifter of the imaging element according to the output of the operating condition judging means.

The vertical shift suspension time is at least a time from the instant of start of the light-blocking operation of the shutter means till the instant when the perfectly light-blocking state of the shutter means is brought about.

The control means controls a time from the instant of transfer of signal charge from the photo-electric converting element section to the vertical shifter of the imaging element till the instant of start of vertical shifting in the vertical shifter on the basis of the output of the operating condition judging means.

The control means controls the timing of starting the light-blocking operation of the shutter means with respect to a vertical sync signal prescribing unit time of obtaining image signal representing one frame image from the imaging element on the basis of the output of the operating condition judging means.

The control means controls the timing of transferring signal charge from the photo-electric converting element section to the vertical shifter with respect to a vertical sync signal prescribing a unit time of obtaining an image signal of one frame image from the imaging element on the basis of the output of the operating condition judging means.

The control means controls the accumulation operation timing of the signal charge corresponding to the scene light flux in the photo-electric converting element section to the vertical shifter with respect to a vertical sync signal prescribing a unit time of obtaining an image signal of one frame image from the imaging element on the basis of the output of the operating condition judging means.

The operating condition judging means judges the ambient temperature as the operating condition of the imaging apparatus.

The control means controls the time from the instant of start of the light-blocking operation of the shutter means till the read-out of the signal charge from the imaging element on the basis of the result of judgment of the ambient temperature in the operating condition judging means such that the time is the longer the lower the ambient temperature.

The operating condition judging means judges the posture of the imaging apparatus as the operating condition thereof.

The control means controls the time from the instant of start of the light-blocking operation of the shutter means till the read-out of the signal charge from the imaging element according to the result of judgment of the posture of the imaging apparatus in the operating condition judging means such that the time is increased the more the imaging apparatus is tilted from a normal state thereof.

The operating condition judging means judges the power supply voltage level as the operating condition of the imaging apparatus.

The control means controls the time from the instant of start of the light-blocking operation of the shutter means till the read-out of the signal charge from the imaging element on the basis of the result of judgment of the power supply voltage level in the operating condition judging means such that the time is increased the lower the power supply voltage level.

The operating condition judging means judges the number of times of operation of the shutter means as the operating condition of the imaging apparatus.

The control means controls the time from the instant of start of the light-blocking operation of the shutter means till the read-out of the signal charge from the imaging element according to the result of judgment of the shutter means operation times number in the operating condition judging means such that the time is increased the greater the operation times number.

According to another aspect of the present invention, there is provided an imaging apparatus having an imaging element for accumulating signal charge corresponding to an incident scene light flux in a photo-electric converting element section and transferring the accumulated signal charge through a vertical shifter to a horizontal shifter so as to be read out therefrom, and a shutter means for selectively blocking the scene light flux to be incident on the imaging element, comprising: an operating condition judging means for judging the operating condition of the imaging apparatus; and a control means for controlling the imaging operation condition of the imaging apparatus; and a control means for controlling operation timings of the shutter means.

According to other aspect of the present invention, there is provided an imaging apparatus having an imaging element for accumulating signal charge corresponding to an incident scene light flux in a photo-electric converting element section and transferring the accumulated signal charge through a vertical shifter to a horizontal shifter so as to be read out therefrom, and a shutter means for selectively blocking the scene light flux to be incident on the imaging element, comprising: an operating condition judging means for judging the operating condition of the imaging apparatus; and a control means for controlling operation timings of the imaging element.

The operating condition judging means judges as the operating condition of the imaging apparatus at least one of the ambient temperature, the posture of the imaging apparatus, the power supply voltage level and the number of times of operation of the shutter means.

The above as well as other objects and features will be clarified from the following description with reference to attached drawings.

BRIEF DESCRIPTION OF THE DRAWINGS

FIG. 1 shows a block diagram showing the construction of a first embodiment of the imaging apparatus according to the present invention;

FIGS. 3(*a*) and 3(*b*) show the construction of a lens stop/shutter unit 61 shown in FIG. 2.

PREFERRED EMBODIMENTS OF THE INVENTION

Preferred embodiments of the present invention will now be described with reference to the drawings.

Figure 15:
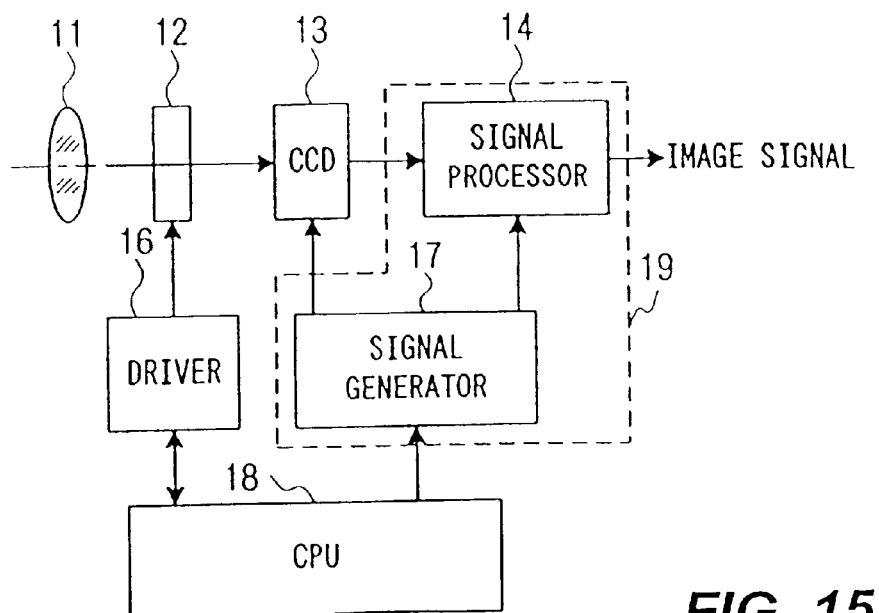
FIG. 15 shows a block diagram showing the construction of a prior art imaging apparatus.

FIG. 1 is a block diagram showing the construction of a first embodiment of the imaging apparatus according to the present invention. In the Figure, parts like those in the imaging apparatus shown in FIG. 15 are designated by like reference numerals, and are not described in detail. In this embodiment, in order to compensate for the response time of the shutter means 12 due to the ambient temperature, a temperature sensor 21 for detecting the ambient temperature Ta is connected to the CPU 18. The temperature sensor 21 may be a thermistor or the like, and is preferably disposed near the shutter means 12 or a power supply battery (not shown). To the CPU 18 is also connected an E²PROM 22, in which reference ambient temperature data Tth and a plurality of time data for setting the vertical shift suspension time tA in the CCD 13, for instance various data including two time data tv and tv' (tv<tV') are stored. To the CPU 18 are further connected a first release switch (LRSW switch) 23a for generating a first trigger pulse upon a first stage depression of a shutter release button (not shown) and a second release switch (2RSW switch) 23b for generating a recording trigger signal upon a second stage depression of the shutter release button.

Figure 2:
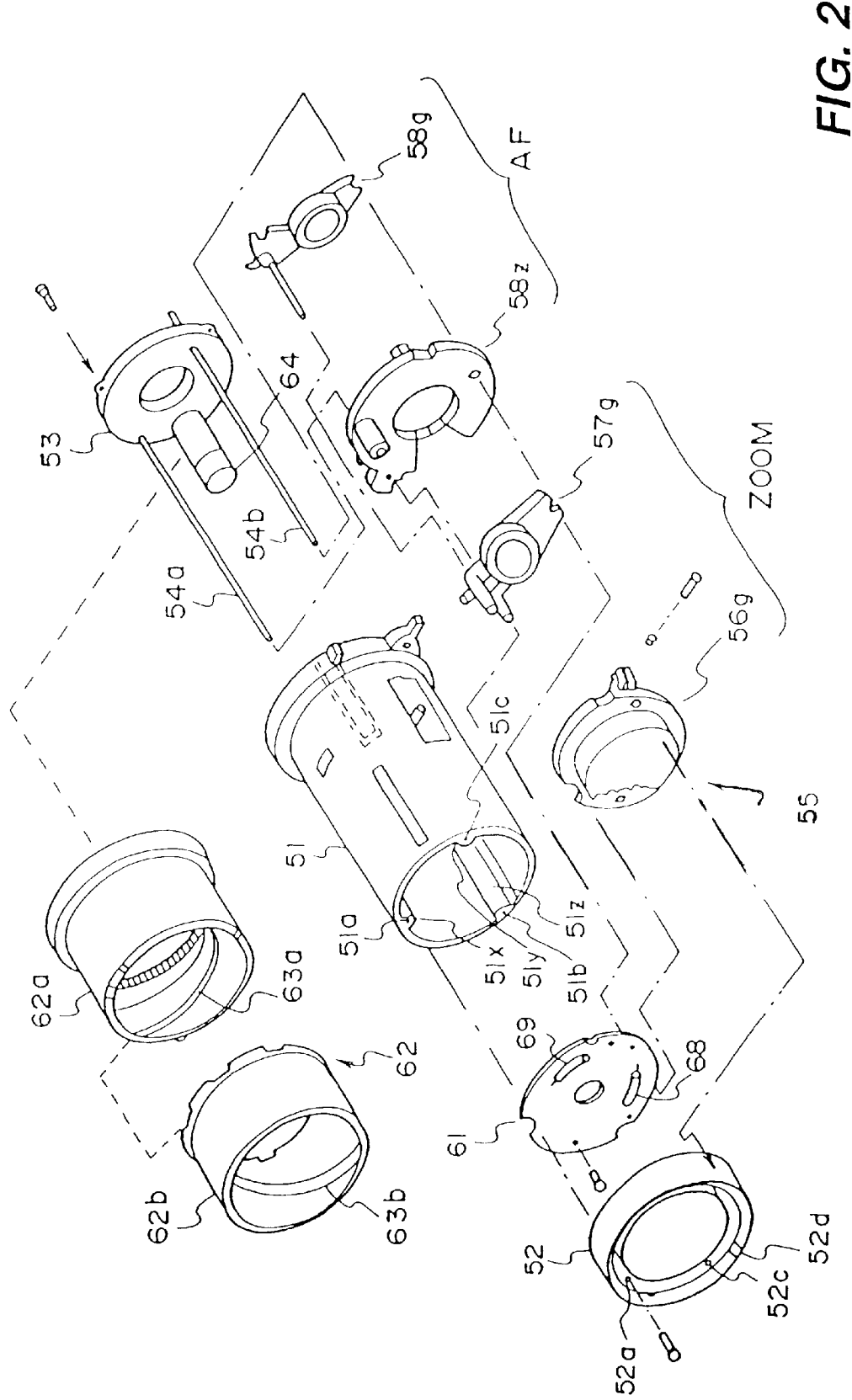
FIG. 2 shows an exploded perspective view showing an example of the construction of a frame unit including an optical system constituting the lens and the shutter means 12 shown in FIG. 1.

FIG. 2 is an exploded perspective view showing an example of the construction of a frame unit including an optical system constituting the lens and the shutter means 12 shown in FIG. 1. Referring to the Figure, illustrated centrally is a substantially cylindrical frame member 51 open at both ends. A fixed lens frame member 52 is secured by such securing means as screwing to the front open end of the frame member 51 on the left side (i.e., scene side) of the Figure. A mounting base member 53 is also secured by such securing means as screwing to the rear open end of the frame member 51 on the right side (i.e., on the side of the CCD 13) in the Figure.

A pair of guide shafts 54a and 54b each have one end secured by bonding to the mounting base member 53 and the other end fittedly supported in an edge portion of the fixed lens frame member 52, and thus extends in the frame member 51 such as to be parallel with the optical axis. A plurality of movable frame members 55 (such as 56G, 57G and 58G) are provided in the frame member 51 such that they can be guided for their sliding in the optical axis direction along the pair guide shafts 54a and 54b.

The movable frame member 58G is movable in its state mounted on a support 58Z and together with the movable frame members 56G and 57G along the guide shafts 54a and 54b. For the sake of the brevity, optical parts with a lens are designated by reference numerals with a prefix G, and those without any lens are designated by numerals with a prefix Z. Although not exactly classified, the movable frame members 56G and 57G are provided mainly for zooming, and the movable frame members 58Z and 58G are provided for auto-focusing (AF). The movable frame members 58Z and 58G are brought closer to or away from each other for auto-focusing by an AF motor installed on the movable frame member 58Z.

The frame member 51 has a plurality of (i.e., three in this embodiment) ribs 51x, 51y and 51z formed on its inner surface such as to extend parallel with the optical axis. The ribs 51x, 51y and 51z extend from the front open end of the frame member 51 up to a position behind the position, at which a light flux controller for mechanically controlling the light flux passing through the movable frame members 55, i.e., the lens stop/shutter unit 61, is installed. The lens stop/shutter unit 61 is accommodated into the frame member 51 from the front open end thereof; it is accommodated by causing its sliding along the ribs 51x to 51y with its notches formed in an edge portion of a substantially disc-like base member thereof in engagement with the ribs 51a to 51z. The ribs 51x to 51z each have one end formed with each of threaded holes 51a to 51c for securing the fixed lens frame member 52 by screwing.

The fix lens frame member 52 has its inner periphery formed with a threaded groove 52d to permit detachable mounting of an optical part such as an adapter lens or a filter from the outside. The fixed lens frame member 52 has an edge portion formed with screw insertion holes 52a to 52c, which correspond to the threaded holes 51a to 51c formed in the three ribs 51x to 51z at one end thereof. In FIG. 2, the screw insertion hole 52b is concealed and not shown.

A cam assembly 62 for causing advancement and retreat of the movable frame members 55 in the optical directions, is fitted for sliding revolution on the outer periphery of the frame member 51. The cam assembly 62 includes a first cam cylinder 62a having an inner peripheral convex cam 63a and a second cam cylinder 62b coupled to the first cam cylinder 62a and having an inner peripheral convex cam 63b. The first and second cam cylinders 62a and 62b are integrally revolved by the zoom motor 64 secured to the mounting substrate 53.

FIGS. 3(a) and 3(b) show the lens stop/shutter unit 61. As shown, the unit 61 includes a substantially disc-like base member 65, which is disposed in the frame member 51 such as to be perpendicular to the optical axis and having a central open-diameter aperture, and a lens stop member 66 and a shutter member 67 both provided in the base member. The lens stop member 65 66 is a thin member having a circular opening of a smaller diameter than the open diameter aperture of the base member 65. The shutter member 67 consists of two thin members. As shown in FIG. 3(a), a lens stop driver 68 and a shutter driver 69 are provided on one surface of the base member 65 such that they face each other. The stop and plunger drivers 68 and 69 both use solenoid plunger mechanisms.

As shown in FIG. 3(b), a lens stop lever 71 which is driven by the lens stop driver 68 for driving the lens stop member 66, and a shutter lever 72 which is driven by the shutter driver 69 for driving the shutter 67, are provided on the other surface of the base member 65. The stop and shutter levers 71 and 72 have the same shape.

In the lens stop-shutter unit 61 having the above construction, when the lens stop lever 71 is not driven by the lens stop driver 68, the lens stop member 66 is concealed inside the base member 65, and the central open-diameter aperture formed in the base member 65 serves the role of a fix stop. When the lens stop driver 68 is driven in this state, the lens stop lever 71 which has a portion in engagement with a solenoid plunger core is caused to undergo revolution. As a result, the lens stop member 66 coupled to a pin formed on the lens stop lever 71 is revolved to stop a past of the light flux through its circular opening. When the lens stop drier 68 is subsequently de-energized, the lens stop member 66 is restored to the initial position by a spring provided on a solenoid plunger core, thus providing the open-diameter aperture again.

When the shutter driver 69 is not driven by the shutter driver source 16, the two leaves of the shutter member 67 are concealed inside the base member 65. When the shutter driver 69 is driven, the shutter lever 72 is caused to undergo revolution to cause the two shutter member leaves to block the light path. When the shutter driver 69 is subsequently de-energized, like the lens stop member 66, the shutter member 67 is retreated into the base member 65.

Figure 4:
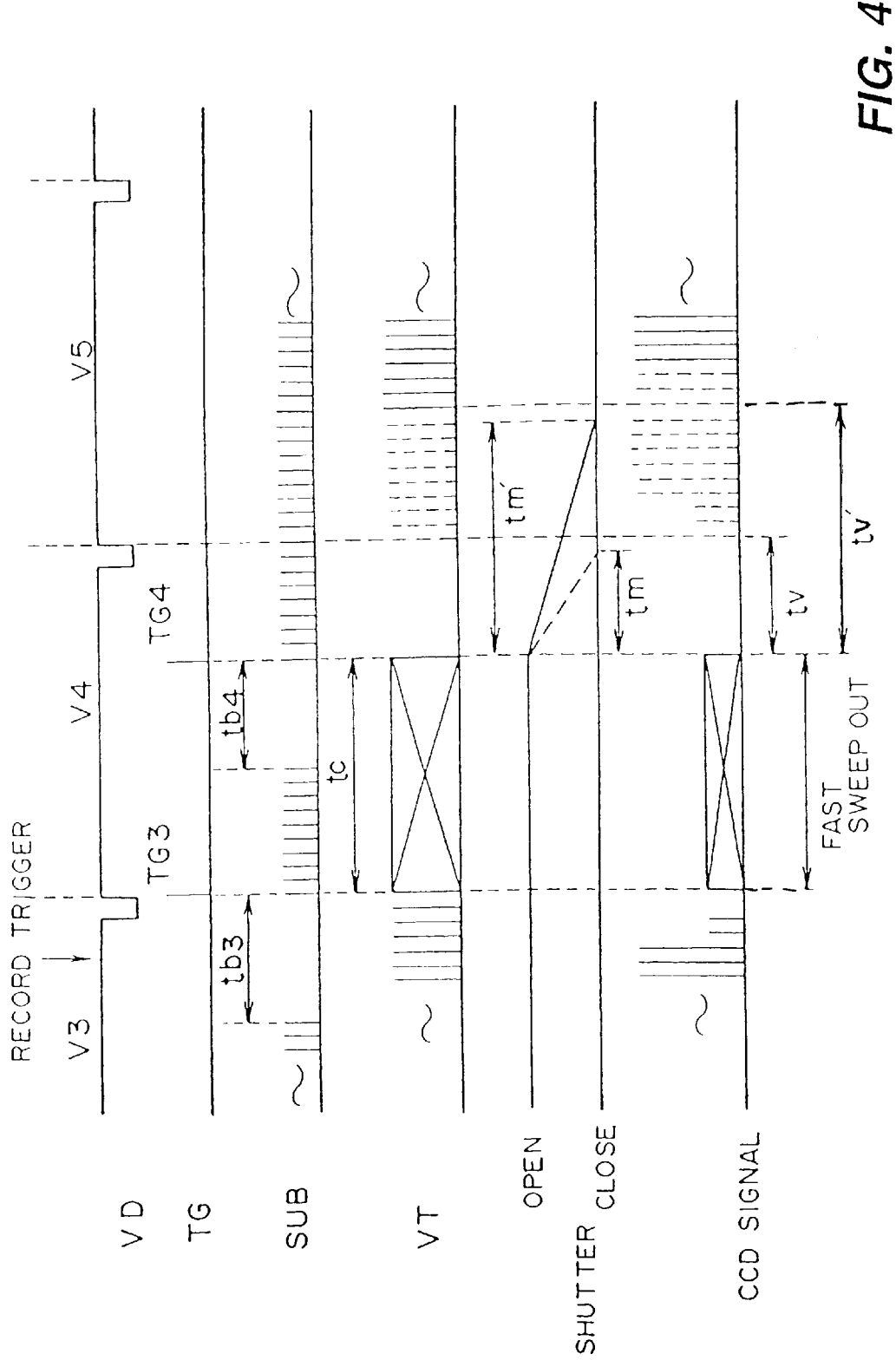
FIG. 4 shows a timing chart illustrating an essential part of the imaging operation in the first embodiment of the imaging apparatus.
Figure 16:
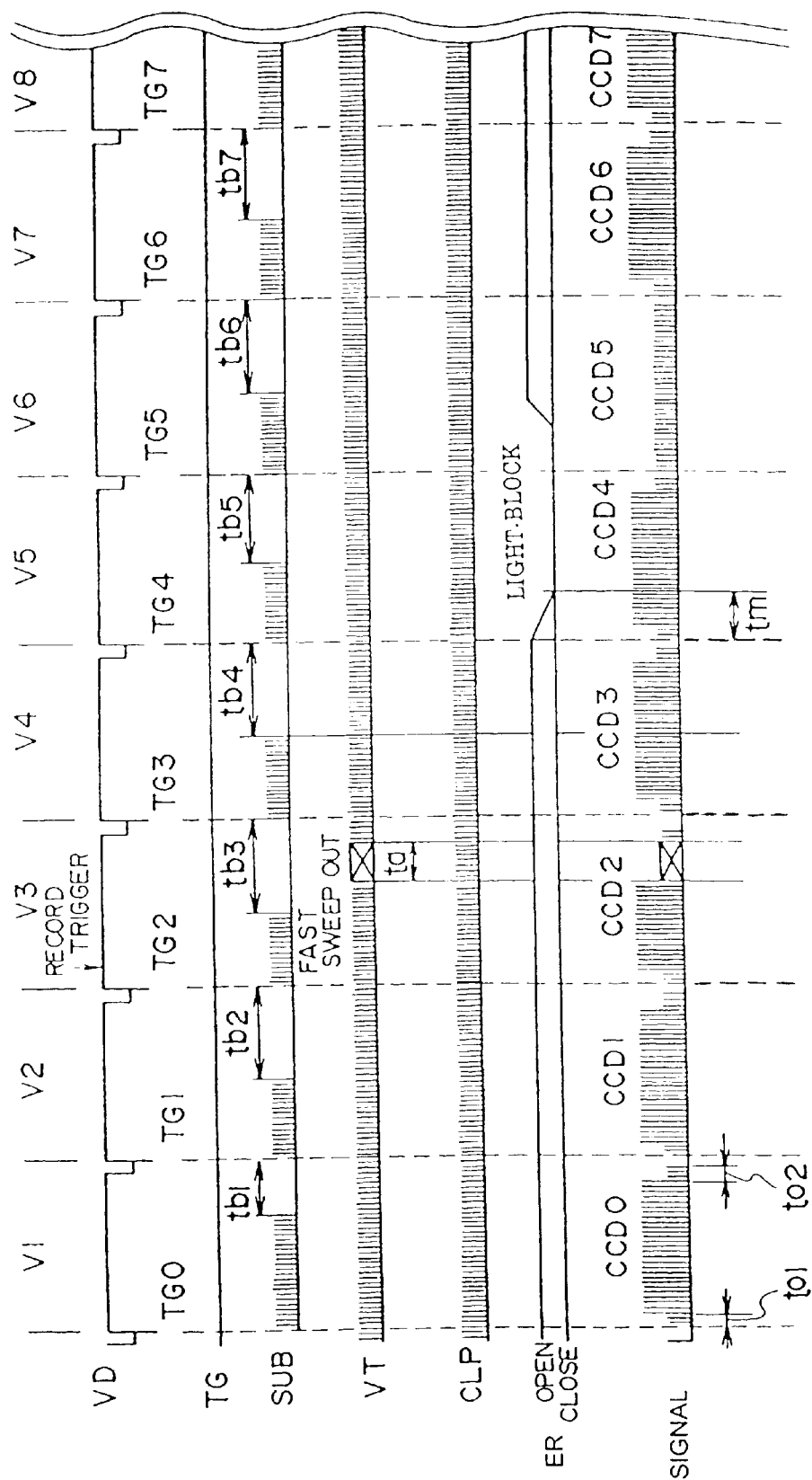
FIG. 16 shows a timing chart illustrating a conventional imaging operation in the imaging apparatus shown in FIG. 15.
Figure 17:
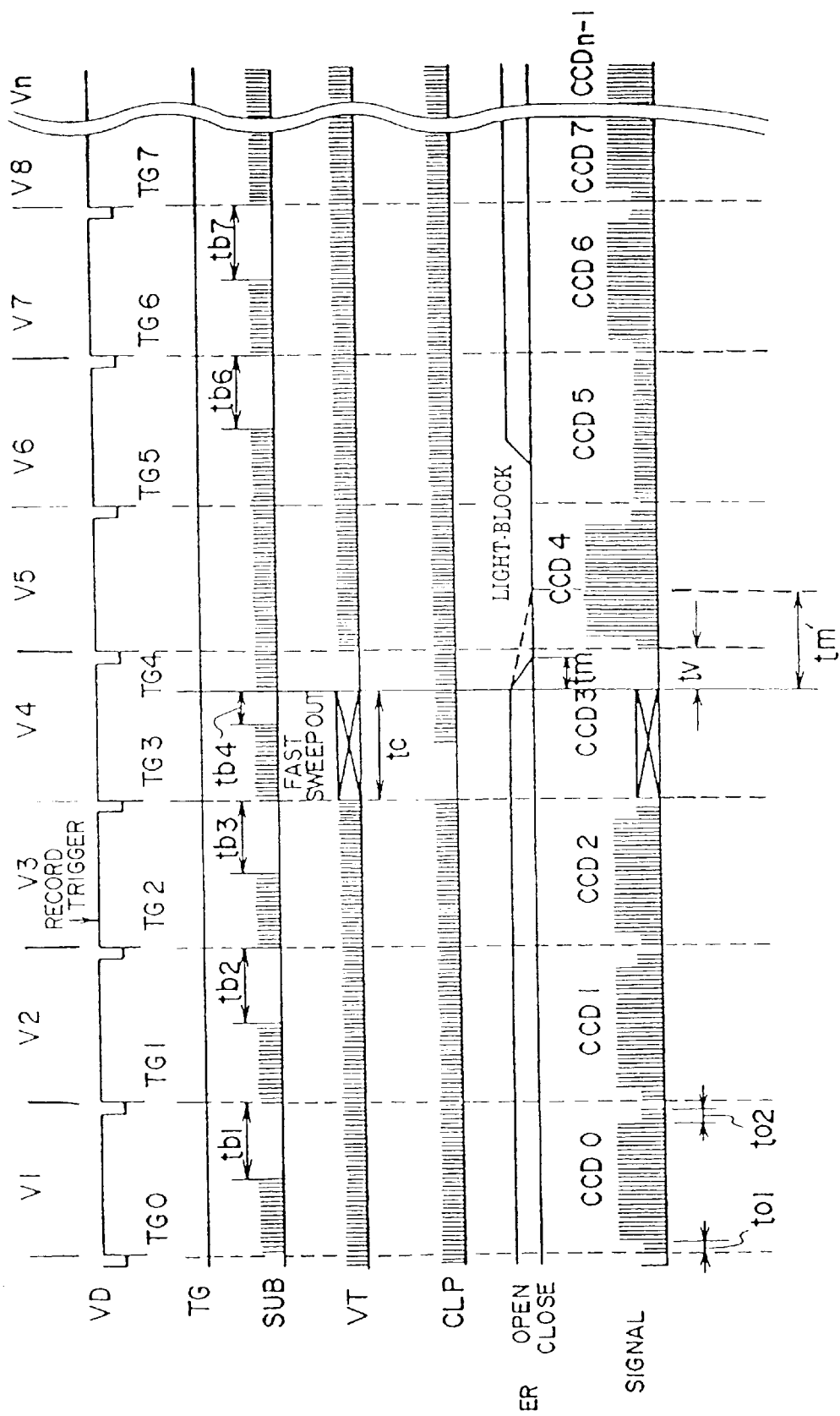
FIG. 17 shows a timing chart illustrating another conventional imaging operation in the imaging apparatus.

FIG. 4 is a timing chart illustrating an essential part of the imagining operating in the first embodiment of the imaging apparatus. The Figures show the vertical sync signal VD, the transfer gate pulse train TG, the sub-pulse train SUB, the vertical shift register shift pulse train VT, the clamp pulse train CLP, the operation of the lens stop driver 68, the operation of the lens stop means 65, the operation of the shutter means 12 and the CCD signal as a signal read out from the CCD 13 as described before regarding the functions in connection with FIG. 16. Here the difference from the operation in the case of FIG. 17 will be mainly described.

In this embodiment, the vertical shift suspension time tA until the start of the read-out of signal charge, which was accumulated during the time section tb4 in the period V4 after the recording trigger signal generation and transferred to the vertical shift registers 3 under control of transfer gate pulse TG4, with vertical shift register shift pulses VT, is selected among the time data tv and tv' for setting according to the comparison of the ambient temperature Ta detected by the temperature sensor 21 and the reference ambient temperature Tth. The time data tv is determined on the basis of the response time tm of the shutter means 12 and an allowance thereof when Ta≧Tth, that is, it is a retroactive time from a vertical sync pulse VD as the instant of start of the period V5 to the fixed instant of generation of the transfer gate pulse TG4. The time data tv' is determined on the basis of the response time tm' of the shutter means 12 and an allowance thereof when Ta<Tth, that is, it is a time from the instant of generation of the transfer gate pulse TG4. Thus, when the vertical shift suspension time tA is set as the time data tv', its trailing end is in the period V5. The unnecessary charge sweep-out operation after the recording trigger signal generation and the control of the start timing of the charge accumulation time section tb4 are the same as in the case of FIG. 17.

Figure 5:
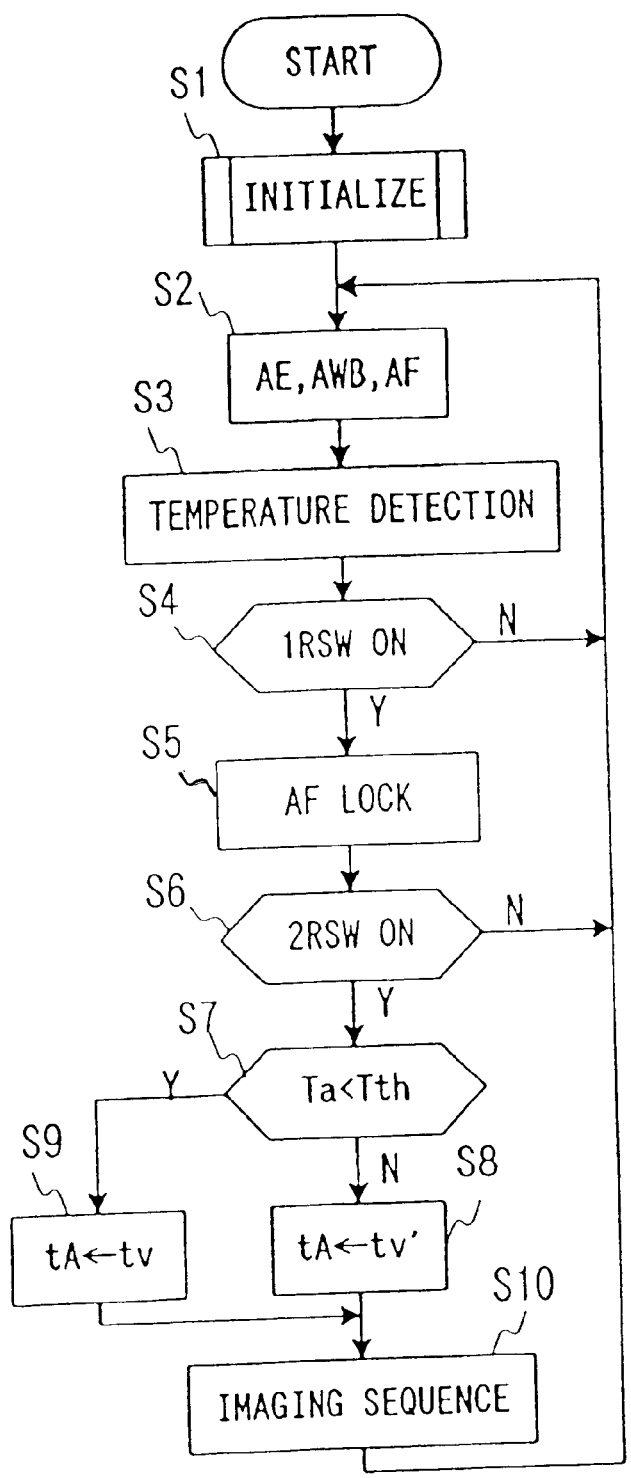
FIG. 5 shows a flow chart for explaining the operation of the embodiment.

The operation of this embodiment will now be described with reference to the flow chart of FIG. 5. With power-"on" of the imaging apparatus, the CPU 18 first executes initial setting (step S1). Then, the CPU 18 literally executes a predetermined process selected among the auto-exposing (AE), the auto-white-balancing (AWB), the auto-focusing (AF), etc. in a predetermined sequence according an image signal obtained from the CCD 13 (step S2). Then, the CPU 18 detects the ambient temperature with the temperature sensor 21 (step S3), and then checks whether the 1RSWE switch 23a has been turned on (step S4). The process data of the AE, AWB, AF, etc. in the step S2 is stored in the E²PROM 22 while updating the old data, and the detected temperature data Ta in the temperature sensor 21 is taken out at a predetermined timing, for instance, and likewise stored in the E²PROM 22 while updating the old data.

When the 1RSW switch 23a is turned on, the CPU 18 executes, for instance, an AF lock process in a predetermined sequence according to the image signal obtained from the CCD 13 (step S5), and checks whether the 2RSW switch 23b has been turned on (step S6).

When the CPU 18 detects in the step S6 that the 2RSW switch 23b has been turned on, it compares the reference ambient temperature data Tth stored in the E²PROM 22 and the newest detected temperature Ta detected by the temperature sensor 21 (step S7). When Ta≧Tth, the CPU 18 selects and sets the time data tv as the vertical shift suspension time tA (step S8), while selecting and setting the time data tv' when Ta<Tth (step S9).

In a subsequent step S10, the CPU 18 controls the imaging operation in an imaging sequence based on the process data of the AE, AWF, AF, etc. and the vertical shift suspension time tA, thus obtaining the image signal. When the time data tv is set as the vertical shift suspension time tA, the read-out of the signal charge accumulated in the CCD 13 during the charge accumulation time section tb4 is controlled in the same way as in the case of FIG. 17. When the time data tv' is set as the vertical shift suspension time tA, the read-out of the signal charge with vertical shift register shift pulses VT is started in the next period V5 after a delay time (tv'−tv) from the vertical sync signal VD, i.e., the instant of start of this period. In this case, the read-out image signal thus may be processed by taking the delay time (tv'−tv) into consideration.

As shown, in the first embodiment, the ambient temperature Ta is detected as the operating condition of the imaging apparatus, and when the detected ambient temperature Ta and the reference ambient temperature Tth are Ta≧Tth, the shorter time data tv is selected as the vertical shift suspension time tA from the start of light-blocking operation of the shutter means 12 till the start of the read-out of the signal charge from the CCD 13 with vertical shift register shift pulses VT, while selecting the longer time data tv' when Ta<Tth, thus controlling the signal charge read-out from the CCD 13. The signal charge read-out thus can be started after the perfectly light-blocking state of the shutter means 12 has been brought about without being influenced by the ambient temperature as the operating condition of the imaging apparatus. It is thus possible to effectively prevent smear and always obtain a high quality image signal free from smear.

Figure 6:
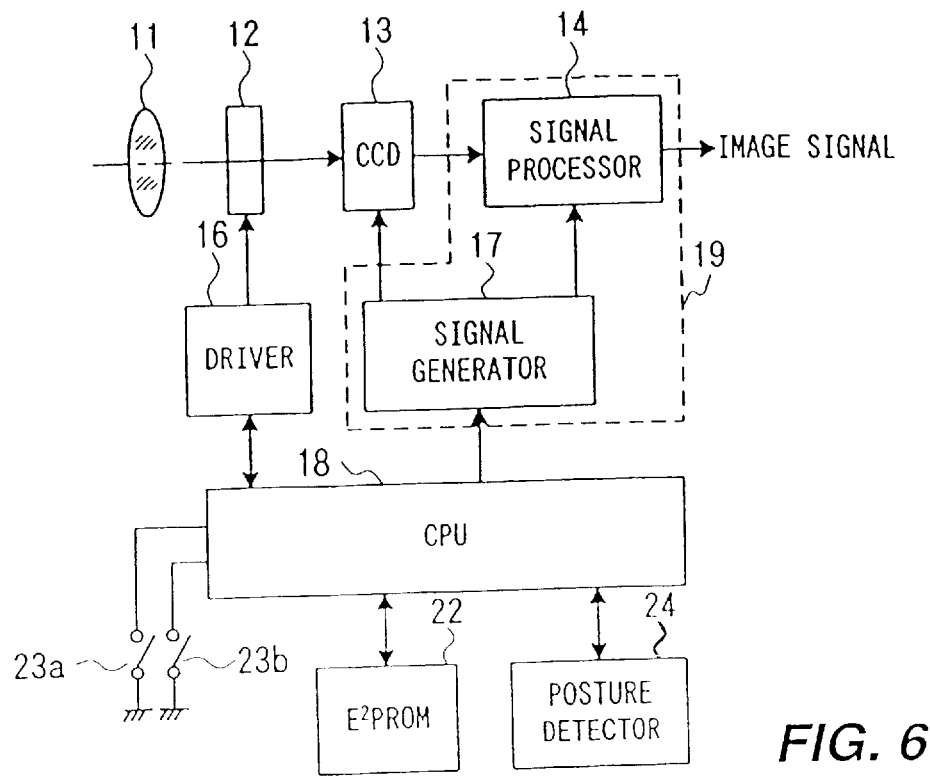
FIG. 6 shows a block diagram showing the construction of a second embodiment of the imaging apparatus according to the present invention.

FIG. 6 is a block diagram showing the construction of a second embodiment of the imaging apparatus according to the present invention. In this embodiment, for compensating the response time of the shutter means 12 due to the posture of the imaging apparatus, a posture detector 24, which detects the posture of the imaging apparatus, i.e., whether the imaging apparatus is directed up or down, and has, for instance, a mercury switch, is connected in lieu of the temperature sensor 21 to the CPU 18 in the imaging apparatus shown in FIG. 1. The vertical shift suspension time to is selected for setting among the time data tv and tv' (tv<tv') according to the posture detected by the posture detector 24. For the remainder of the construction and the operation, this embodiment is the same as the first embodiment, and here the difference in operation from the first embodiment will be mainly described.

In this embodiment, the time data tv is determined on the basis of the response time tm of the shutter means 12 and an allowance thereof when the imaging apparatus is directed neither up nor down but is in the normal state, and like the first embodiment it is a retroactive time from the vertical sync signal VD as the instant of start of the period V5 for shifting the signal charge accumulated during the charge accumulation time section tb4 in the preceding period V4 after the recording trigger signal generation in FIG. 4, to the vertical shift registers 3 till the instant of generation of transfer gate pulse TG4 set at a fixed timing. The time data tv' is determined on the basis of the response time tm' of the shutter means 12 and an allowance thereof when the imaging apparatus is directed either up or down, and is a time elapsed from the instant of generation of the transfer gate pulse TG4, i.e., the instant of start of the time data tv. Thus, again in thins embodiment, when the time data tv' is set as the vertical shift suspension tine tA, the end thereof is in period V5.

Figure 7:
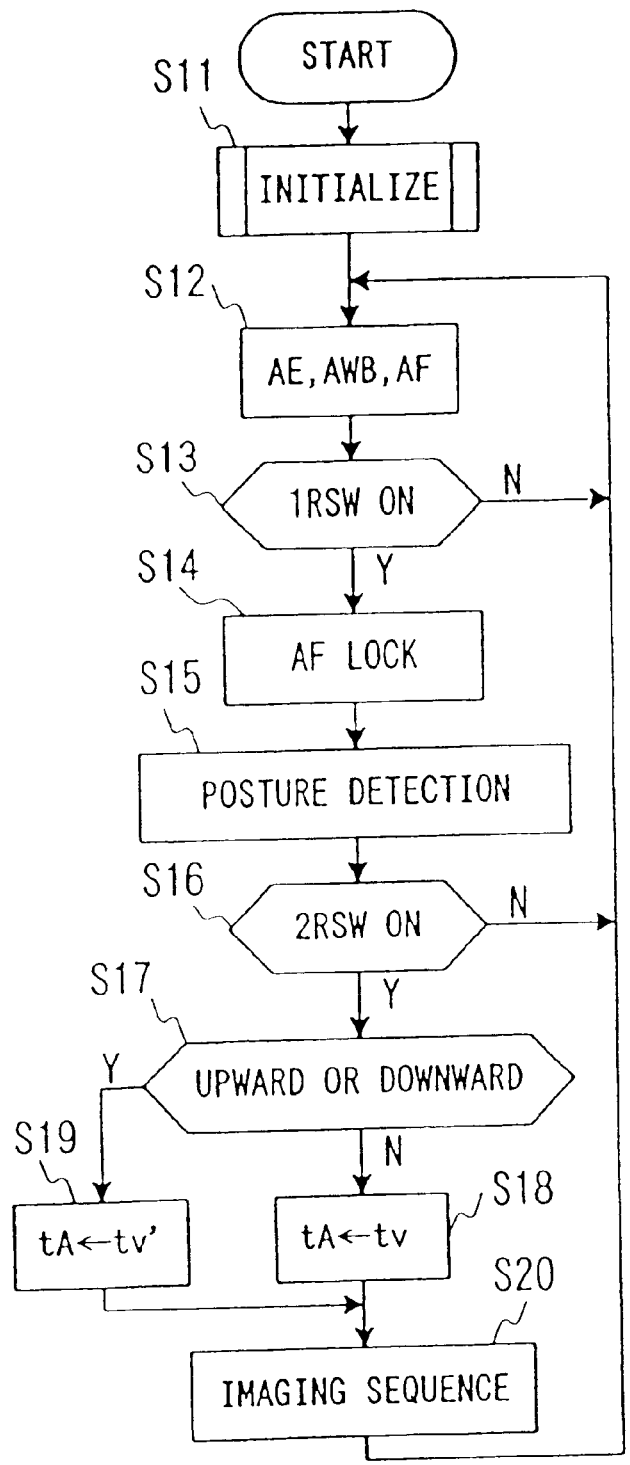
FIG. 7 shows a flow chart for explaining the operation of the second embodiment.

The operation of this embodiment will now be described with reference to the flow chart shown in FIG. 7. With power-"on" of the imaging apparatus, the CPU 18 executes initial setting (step S11). Then, the CPU 18 literally executes a predetermined process among the AE, AWB, AF, etc. in a predetermined sequence according to an image signal, obtained from the CCD 13 (step S12), and checks whether the 1RSW switch 23a has been turned on (step S13).

When the 1RSW switch 23a has been turned on, the CPU 18 executes, for instance, an AF lock process in a predetermined sequence according to image signal obtained from the CCD 13 (step S14), detects the posture of the image by taking out the output of the posture detector 24 (step S15), and checks whether the 2RSW switch 23b has been turned on (step S16).

When the CPU 18 detects in the step S16 that the 2RSW switch 23b has been turned on, it checks whether the imaging apparatus posture detected in the step S15 is such that the imaging apparatus is directed either up or down (step S17). When the imaging apparatus is directed neither up nor down, the CPU 18 judges that the imaging apparatus is in the normal state and selects and sets the time data tv as the vertical shift suspension time tA (step S18). When the imaging apparatus is directed up or down, the CPU 18 selects and sets the time data tv' as the vertical shift suspension time tA (step S19).

In a subsequent step S20, like the first embodiment, the CPU 18 controls the imaging operation in an imaging sequence according to process data of the AE, AWB, AF, etc. and also the vertical shift suspension time tA that has been set, thus obtaining an image signal.

As shown, in the second embodiment, the posture of the imaging apparatus is detected as the operating condition thereof, and the read-out of a signal from the CCD 13 is controlled by selecting, when the imaging apparatus posture is normal, the shorter time data tv as the vertical shift suspension time tA from the start of the light-blocking operation of the shutter means 12 till the start of the read-out of signal charge from the CCD 13 with vertical shift register shift pulses VT, while selecting the longer time data tv' when the imaging apparatus is directed up or down. The signal charge read-out thus can be started after the perfectly light-blocking state of the shutter means 12 has been brought about without being influenced by the posture of the image as the operating condition thereof, that is, even in the case when the imaging apparatus is directed up or down, in which case the two leaves of the shutter member 67 shown in FIG. 3 may receive a pressure from a different member or be brought into contact with each other to result in friction increase and light-blocking operation lag time increase. As a result, like the first embodiment, it is thus possible to effectively prevent smear and always obtain a high quality image signal free from smear.

Figure 8:
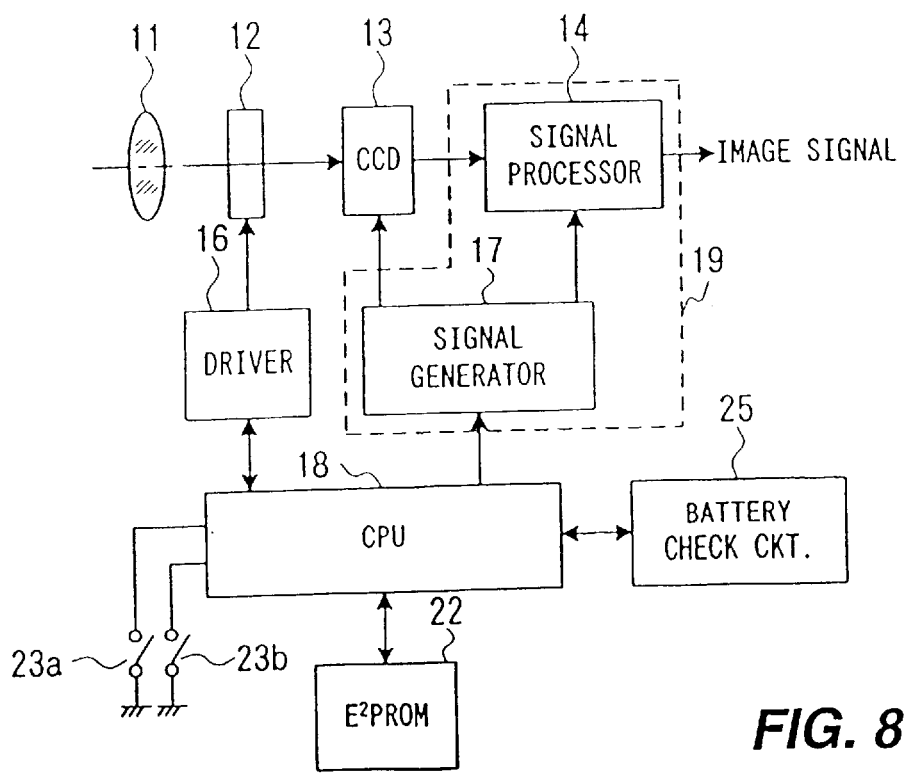
FIG. 8 shows a block diagram showing the construction of a third embodiment of the imaging apparatus according to the present invention.

FIG. 8 is a block diagram showing the construction of a third embodiment of the imaging apparatus according to the present invention. In this embodiment, for compensating the response time of the shutter means 12 due to the power supply (or battery) voltage level, a battery checker 25 is connected in lieu of the temperature sensor 21 to the CPU 18 in the imaging apparatus shown in FIG. 1. The vertical shift suspension time tA is selected and set among the time data tv and tv' (tv<tv') on the basis of the comparison result of the voltage level VCC detected by the battery checker 25 and a predetermined voltage level, for instance an operation guaranteeing voltage level VBC. The remainder of the construction and the operation of this embodiment is the same as in the first embodiment. Here, the difference in operation from the first embodiment will be mainly described.

In this embodiment, the operation guaranteeing voltage level VBC is preliminary stored in the E$^2$PROM 22. The time data tv is determined on the basis of the response time tm of the shutter means 12 and an allowance thereof when VCC>VBC, and like the first embodiment it is a retroactive time from the vertical sync signal VD as the instant of start of the next period V5 to transfer the signal charge accumulated during the charge accumulation time section tb4 in the preceding period V4 after the recording trigger signal generation in FIG. 4, to the vertical shift registers 3 till the instant of generation of transfer gate pulse TG4 set at a fixed timing. The time data tv' is determined on the basis of the response time tm' of the shutter means 12 and allowance thereof when VCC<VBC, and a time from the instant of start of the transfer gate pulse TG4, i.e., the start of the time data tv. Thus, again in this embodiment, when the time data tv' is set as the vertical shift suspension time tA, the end thereof is in the period V5.

Figure 9:
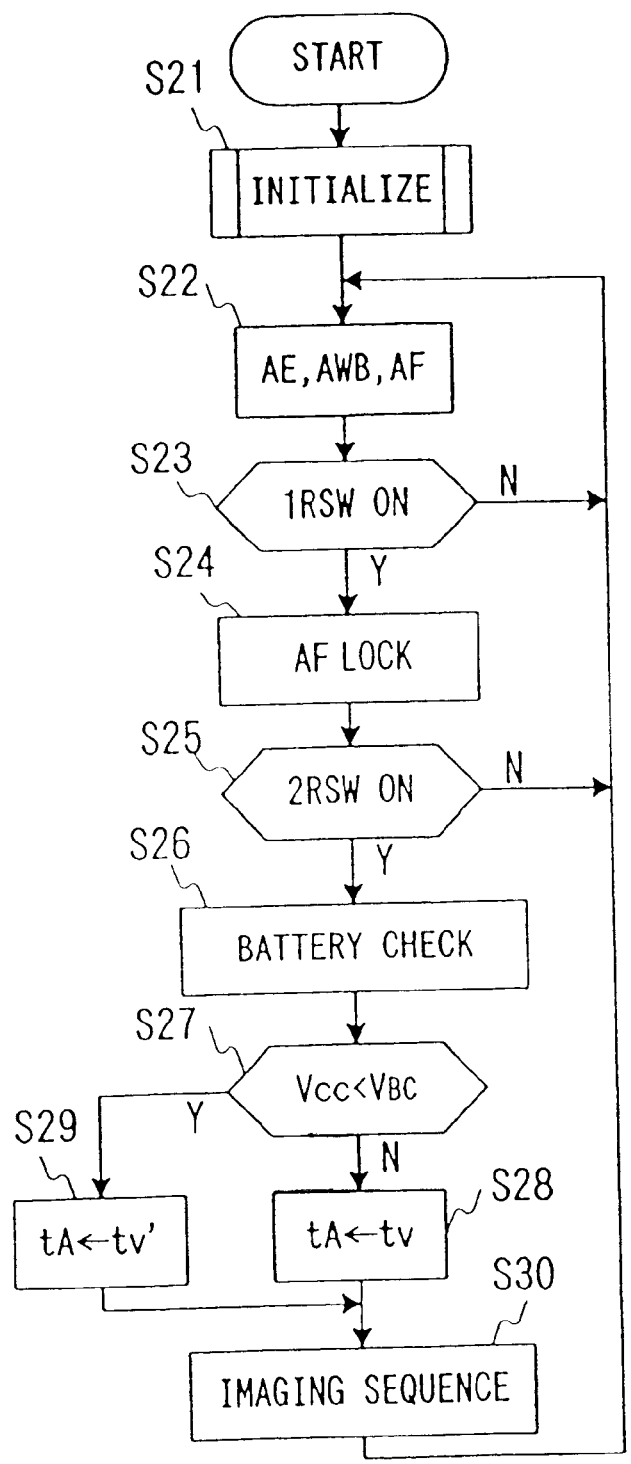
FIG. 9 shows a flow chart for explaining the operation of the third embodiment.

The operation of this embodiment will now be described with reference to the flow chart of FIG. 9. With power-"on" of the imaging apparatus, the CPU 18 executes initial setting (step S21). Then, the CPU 18 literally executes a predetermined process among the AE, AWB, AF, etc. in a predetermined sequence according to image signal obtainable from the CCD 13 (step S22), and checks whether the 1RSW switch 23a has been turned on (step S23).

When the 1RSW switch 23a has been turned on, the CPU 18 executes, for instance, an AF lock process (step S24) in a predetermined sequence according to image signal obtained from the CCD 13, and checks whether the 2RSW switch 23b has been turned on (step S25).

When the CPU 18 detects in the step S25 that the 2RSW switch 23b has been turned on, it detects the supply voltage level VCC with the battery checker 25 (step S26), and compares the detected supply voltage level VCC and the operation guaranteeing voltage level VBC preliminary stored in the E$^2$PROM 22 (step S27).

When VCC>VBC, normal operation can be guaranteed, and at this time the CPU 18 selects and sets the time data tv as the vertical shift suspension time tA (step S28), while setting the time data tv' when VCC<VBC (step S29).

In a subsequent step S30, like the first embodiment the CPU 128 controls the imaging operation in an imaging sequence based on process data of the AE, AWB, AF, etc. and also the vertical shift suspension time tA that is set, thus obtaining the image signal.

As shown, in the third embodiment the power supply voltage level VCC is detected as the operating condition of the imaging apparatus. The read-out of signal from the CCD 13 is controlled by selecting, when the detected power supply voltage level VCC and the predetermined operation guaranteeing voltage level VBC are VCC>VBC, the shorter time data tv as the vertical shift suspension time tA from the start of the light-blocking operation of the shutter means 12 till the start of reading out the signal charge from the CCD 13 with vertical shift register shift pulses VT, while setting the longer time data tv' when VCC<VBC. The signal charge read-out thus can be started after the perfectly light-blocking state of the shutter means 12 has been brought about when the power supply voltage level VCC becomes slightly lower than the operation guaranteeing voltage level VBC as well as of course when VCC is above VBC. Thus, like the previous embodiment, it is possible to effectively prevent smear, and a high quality image signal free from smear can always be obtained from the CCD 13.

Figure 10:
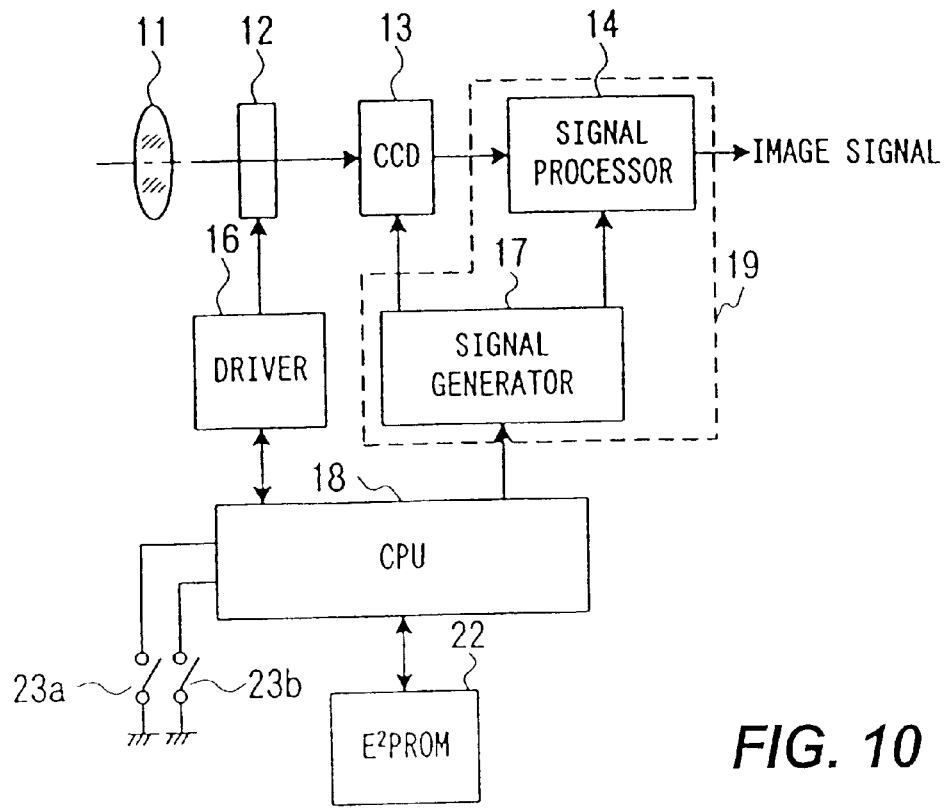
FIG. 10 shows a block diagram showing the construction of a fourth embodiment of the imaging apparatus according to the present invention.

FIG. 10 is a block diagram showing the construction of a fourth embodiment of the imaging apparatus according to the present invention. In this embodiment, for the compensation of the response time of the shutter means 12 due to changes with age, the temperature sensor 21 in the imaging apparatus shown in FIG. 1 is omitted, and the number of times of releasing of the shutter means 12 is stored in the $E^2$PROM 22 for setting the vertical shift suspension time tA according to the number of releasing times. For the remainder of the construction and the operation, this embodiment is the same as in the first embodiment, and here the difference in operation from the first embodiment will be mainly described.

In this embodiment, the vertical shift suspension time tA is set by storing a time data table corresponding to the number of releasing times or an approximation formula for computing the time data on the basis of the number of releasing times in the $E^2$PROM. Also, with the initial number of releasing times, the vertical shift suspension time tA is determined on the basis of the response time tm of the shutter means 12 and an allowance thereof with that number, like the first embodiment it is a retroactive time from the vertical sync signal VD, i.e., the instant of start of the period V5, for transferring the signal charge, which has been accumulated in the charge accumulation time section tb4 in the preceding period V4, to the vertical shift registers 3 after the recording trigger signal generation in FIG. 4. As the number of releasing times increases, the longer time data is set with the instant of generation of transfer gate pulse TG4 as a reference time instant. Thus, again in this embodiment when the time data that is set is increased, its end is in the period V5.

Figure 11:
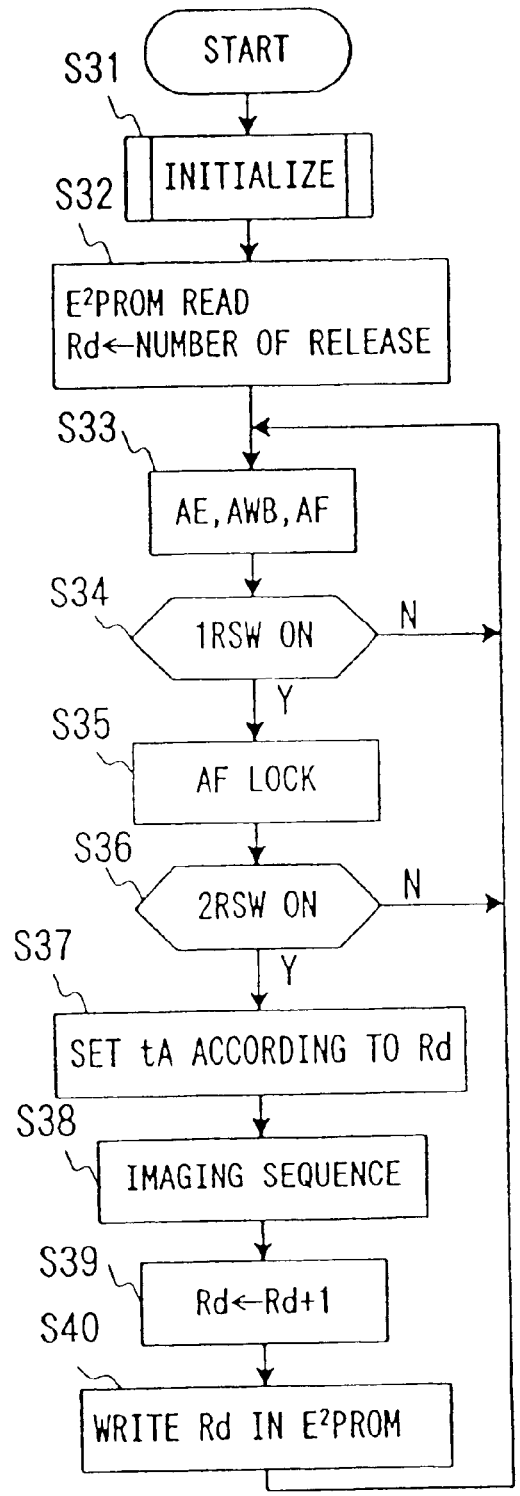
FIG. 11 shows a flow chart for explaining the operation of the fourth embodiment.

The operation of this embodiment will now be described with reference to the flow chart of FIG. 11. With power-"on" of the imaging apparatus, the CPU 18 first executes initial setting (step S31). Then, the CPU 18 reads out the number Rd of releasing times from the. $E^2$PROM 22 (step S32), literally executes a predetermined process among the AE, AWF, AF, etc. in a predetermined sequence according to image signal obtained from the CCD 13 (step S33), and checks whether the 1RSW switch 23a has been turned on (step S34).

When the 1RSW switch 23a has been turned on, the CPU 18 executes, for instance, an AF lock process in a predetermined sequence according to the image signal obtained from the CCD 13 (step S35), and checks whether the 2RSW switch 23b has been turned on (step S36).

When the CPU 1 detects in the step S36 that the 2RSW switch 23b has been turned on, it sets the time data of the vertical shift suspension time tA on the basis of the table or the approximation formula stored in the $E^2$PROM according to the releasing times number Rd read out in the step S32 (step S37). In the subsequent step S38, like the first embodiment the CPU 18 controls the imaging operation in an imaging sequence based on the process data of the AE, AWB, AF, etc. and the vertical shift suspension time tA having been set.

Then, the CPU 18 increments the releasing times number Rd (step S39), and writes the incremented number Rd in the $E^2$PROM 22 (step S40).

As shown, in the fourth embodiment the number of times of releasing of the shutter means 12 is judged as the operating condition of the imaging apparatus , and the greater the releasing times number the longer time data is set as the vertical shift suspension time tA from the start of the light-blocking operation of the shutter means 12 till the start of reading out the signal charge from the CCD 13 with vertical shift register shift pulses VT, thus controlling the read-out of signal from the CCD 12. The signal charge read-out thus can be started after the perfectly light-blocking state of the shutter means 12 has been brought out without being influenced by changes with age. Thus, like the previous embodiment it is possible to effectively prevent smear, and a high quality image signal free from smear can always be obtained for the CCD 13.

In the above first to fourth embodiments, the timing of generation of the transfer gate pulse TG4 for the transfer of the signal charge accumulated during the charge accumulation time section tb4 in the period V4 to the vertical shift registers 3 after the recording trigger signal generation is set to an instant leading the start of the next period V5 by a time (tv) determined on the basis of the response time tm of the shutter means 12 and an allowance thereof for the ambient temperature, the imaging apparatus posture, the power supply voltage or the changes with age. The light-blocking operation of the shutter means 12 is started and the vertical transfer suspension time tA is set. The read-out of the signal charge transferred to the shift registers 3 with vertical shift register shift pulses VT is started from the end of the vertical shift suspension time tA.

Figure 12:
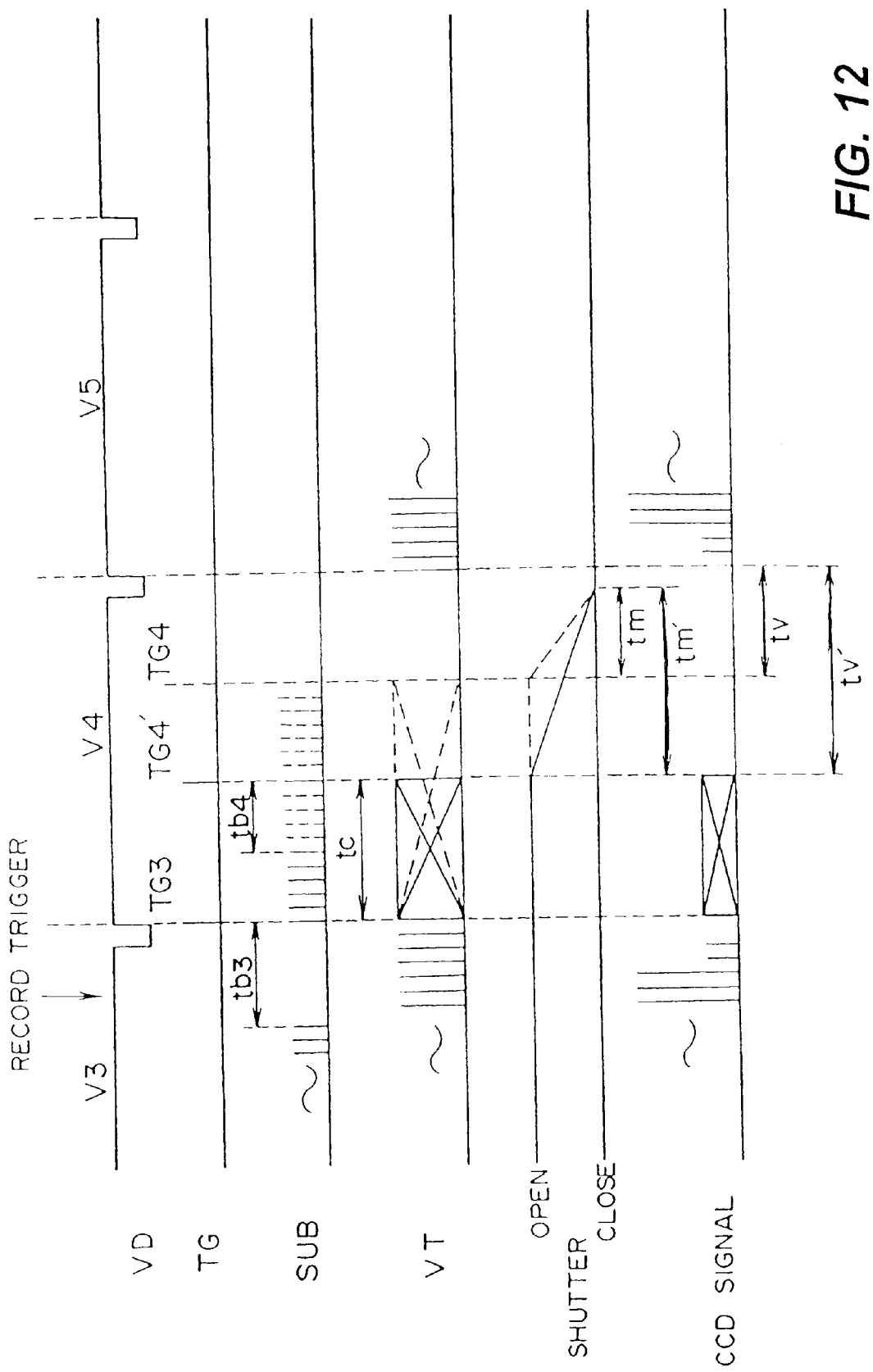
FIG. 12 shows a timing chart for explaining the operation of the fifth embodiment.

A fifth embodiment of the present invention will now be described. In this embodiment, as shown in FIG. 12, the timing of generation of the transfer gate pulse for the transfer of the signal charge accumulated in the charge accumulation time section tb4 in the period V4 to the vertical shift registers 3 after the recording trigger signal generation, is made variable. Specifically, the transfer gate pulse is set retroactively on the basis of the vertical sync signal VD as the instant of start of the period V5 according to the vertical shift suspension time that is set in correspondence to the ambient temperature, the imaging apparatus posture, the power supply voltage or the changes with age, and the timing of application of sub-pulses SUB defining the start of the charge accumulation time section tb4 is set on the basis of the transfer gate pulse generation timing. In addition, the charge signal transferred to the vertical shift registers 3 under control of the transfer gate pulse, starts to be read out with vertical shift register shift pulses VT in synchronism to the vertical sync signal VD. In FIG. 12, transfer gate pulse TG4 corresponding to vertical shift suspension time tv and transfer gate pulse TG4' corresponding to vertical shift suspension time tv' are shown.

Thus, again in this embodiment, like the first to fourth embodiments the signal charge read-out can be started after the perfectly light-blocking state of the shutter means 12 has been brought out without being influenced by the ambient temperature, the imaging apparatus posture, the power supply voltage level or the changes with age. Like the previous embodiment, it is thus possible to effectively prevent the generation of smear and obtain high quality image signal free from smear from the CCD 13. In addition, in the fifth embodiment, the read-out of the signal charge transferred to the vertical shift registers 3 with vertical shift register shift pulses VT, is always started in synchronism to the vertical sync signal VT. This is desired from the standpoint of the simplification of the read-out control.

The embodiments described above are by no means limitative, and they may be changed and modified variously. For example, instead of two different vertical shift suspension times to be selected on the basis of the detected ambient temperature, imaging apparatus posture and power supply voltage level, it is possible to permit selection among a grater greater number of different times and set an appropriate one according to the detected ambient temperature, imaging apparatus posture or power supply voltage level. Also, the shutter means 12 is not limited to the mechanical shutter noted above, but the present invention is also effectively applicable to the case of using a different optical shutter such as a liquid crystal shutter.

Figure 13:
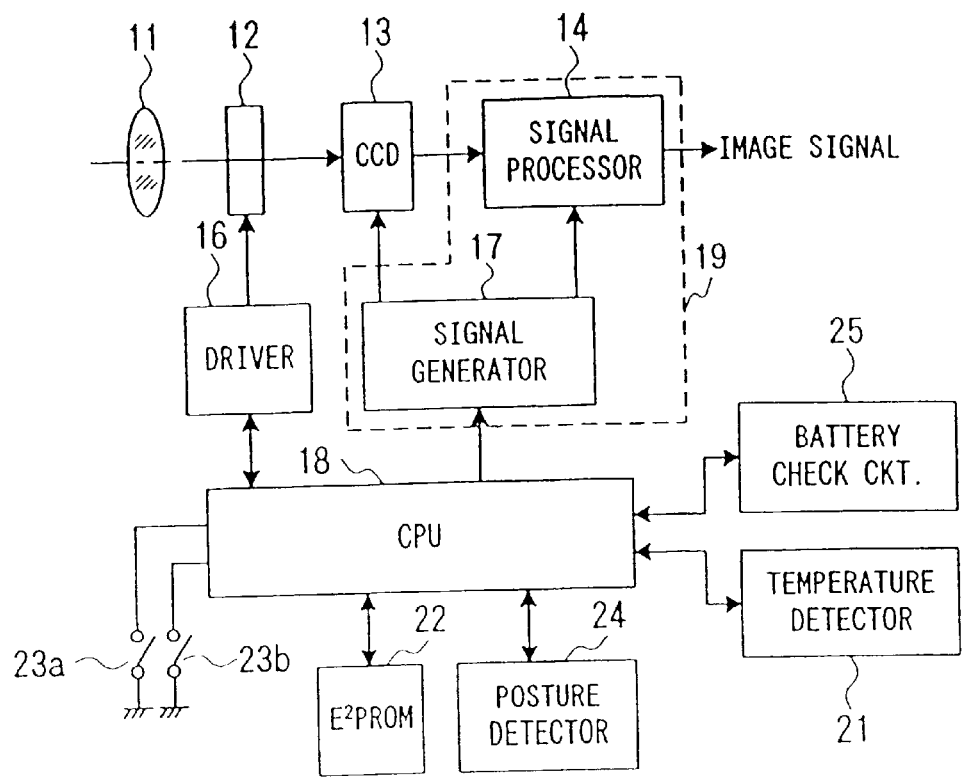
FIG. 13 shows a block diagram showing a modified construction of the imaging apparatus according to the present invention.
Figure 14:
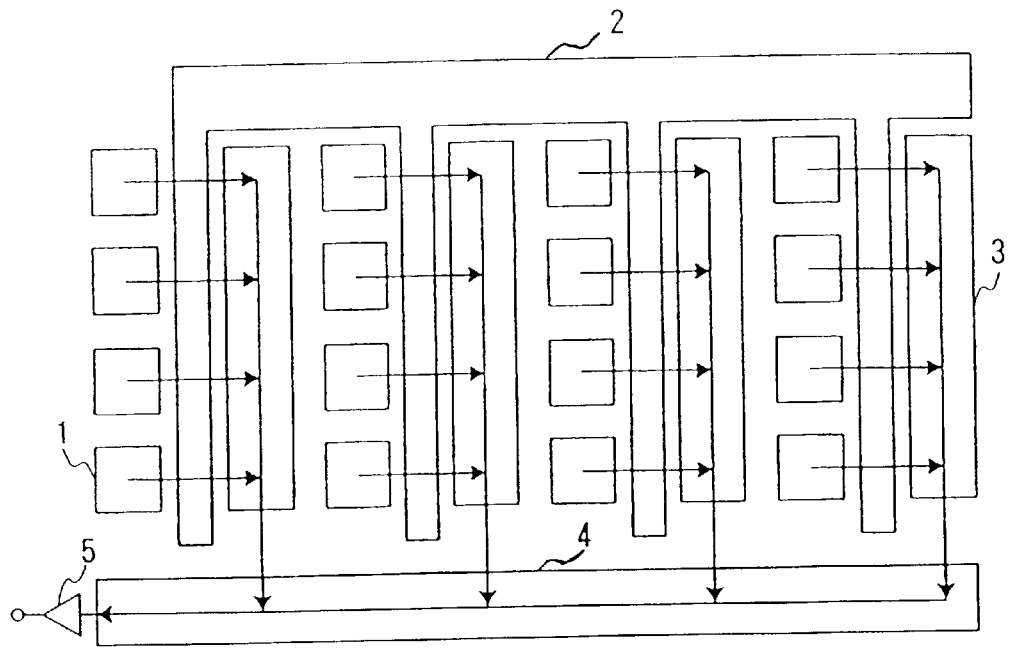
FIG. 14 shows an example of CCD as the imaging element applicable to the imaging apparatus of the present invention.

Furthermore, it is possible to permit selection of the vertical shift suspension time from a combination of two or more different operating conditions such as the ambient temperature, the imaging apparatus posture, the power supply voltage level and the changes with age. For example, as shown in FIG. 13, the temperature sensor 21, the E²PROM 22, the posture detector 24 and the battery checker 25 may be combined to permit selection of vertical shift suspension times for operating condition of the ambient temperature, the image posture, the power supply level and the changes with age and setting of the longest one of the corresponding time data as the vertical shift suspension time for controlling the imaging operation as described before in connection with FIG. 4 or 12.

Still further, while in the fifth embodiment for starting the light-blocking operation of the shutter means 12 the timing of generation of the transfer gate pulse for the transfer of the signal charge accumulated in the charge accumulation time section after the recording trigger signal generation is controlled retroactively from the next vertical sync signal on the basis of the vertical shift suspension time set according to the operating condition, it is also possible to cause the light-blocking operation of the shutter means 12 to be started by generating the transfer gate pulse in synchronism with the vertical sync signal, set the vertical shift suspension time according to the operating condition with reference to the generated transfer gate pulse and cause the signal charge read-out with vertical shift register shift pulses to be started from the instant of end of the vertical shift suspension time.

Moreover, the imaging element is not limited to the inter-line CCD having the vertical overflow drain structure described before, but the present invention is also effectively applicable to the case of using a different CCD or various solid-state imaging elements such as an MOS imaging device.

According to the present invention, the imaging operation is controlled by judging the operating condition of the imaging apparatus, and it is thus possible to start the read-out of the signal charge from the imaging element after the perfectly light-blocking state of the shutter means has been brought about. It is thus possible to effectively prevent the generation of smear and thus obtain high quality image signal free from smear from the imaging element.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An imaging apparatus having an imaging element for accumulating signal charge corresponding to an incident scene light flux in a photo-electric converting element section and transferring the accumulated signal charge through a vertical shifter to a horizontal shifter so as to be read out therefrom, and a shutter means for selectively blocking the scene light flux to be incident on the imaging element, comprising:

an operating condition judging means including means for monitoring an operating condition having an effect on the imaging apparatus;

and means for comparing the operating condition being monitored with a predetermined threshold; and a control means for controlling a start of a light-blocking operation of the shutter means and adjusting a time between initiation of transfer of signal charge from the photo-electric converting element section to the vertical shifter of the imaging element, which coincides with the start of the light block operation to initiation of vertical shifting of accumulated charge along the vertical shifter responsive to an output of the operating condition judging means to assure that the light blocking is completed before initiation of vertical shifting.

2. The imaging apparatus according to claim 1, wherein: the control means provides an adjustable vertical shift suspension time from initiation of a light-blocking operation of the shutter to initiation of shifting of accumulated charge along the vertical shifter of the imaging element responsive to the output of the operating condition judging means.

3. The imaging apparatus according to claim 2, wherein: the adjustable vertical shift suspension time is at least equal to a time from said initiation of the light-blocking operation of the shutter means to an instant when a complete light-blocking state of the shutter means is brought about.

4. The imaging apparatus according to claim 1, wherein: the control means controls the timing of starting initiation of the light-blocking operation of the shutter means a first predetermined time after to a vertical sync signal initiating a unit time of obtaining an image signal representing one frame from the imaging element and prior to a second vertical sync signal which marks termination of said one frame responsive to the output of the operating condition judging means.

5. The imaging apparatus according to claim 1, wherein: the control means controls initiation of transferring signal charge from the photo-electric converting element section to the vertical shifter a first predetermined time after a first vertical sync signal initiating a unit time of obtaining an image signal of one frame image from the imaging element and a second predetermined time prior to a second vertical sync signal which marks termination of said one frame responsive to the output of the operating condition judging means.

6. The imaging apparatus according to claim 1, wherein:

the control means controls an accumulation operation timing of the signal charge corresponding to the scene light flux in the photo-electric converting element section to the vertical shifter with respect to a vertical sync signal prescribing a unit time of obtaining an image signal of one frame image from the imaging element responsive to an output of the operating condition judging means.

7. The imaging apparatus according to claim 1, wherein:

the operating condition judging means monitors ambient temperature as the operating condition of the imaging apparatus.

8. The imaging apparatus according to claim 7, wherein:

the control means adjusts said time interval such that said time interval is the longer, when the ambient temperature is reduced.

9. The imaging apparatus according to claim 1, wherein:

the operating condition judging means monitors posture of the imaging apparatus as the operating condition thereof.

10. The imaging apparatus according to claim 9, wherein:

the control means adjusts said time interval such that said time is longer, when the imaging apparatus is tilted further from a normal posture.

11. The imaging apparatus according to claim 1, wherein:

the operating condition judging means monitors power supply voltage level of said imaging apparatus as said operating condition.

12. The imaging apparatus according to claim 11, wherein:

the control means adjusts the time interval such that said time interval is longer, when the power supply voltage level is reduced.

13. The imaging apparatus according to claim 1, wherein:

the operating condition judging means monitors a number of times of operation of the shutter means as said operating condition.

14. The imaging apparatus according to claim 13, wherein:

the control means adjusts the time interval of the light such that time interval is increased responsive to a greater the number of operations of the shutter means.

15. The imaging apparatus according to claim 1, wherein:

the operating condition judging means monitors as an operating condition of the imaging apparatus at least one of ambient temperature, a posture of the imaging apparatus, power supply voltage level and a number of times of operation of the shutter means.

16. The imaging apparatus of claim 1 further comprising:

means for generating vertical sync signals at constant given intervals to mark the start and finish of an image frame;

means for generating sub pulses for clearing accumulated signal charge from said imaging element preparatory to accumulation of an image for a given signal accumulation time interval;

said control means terminating said sub pulses for a given signal accumulation time interval which interval terminates prior to a vertical sync signal which marks completion of an image frame that incorporates said given time signal accumulation interval to enable proper accumulation of signal charge by said imaging element.

17. The imaging apparatus of claim 16 wherein said control means initiates closing of said shutter means at time prior to generation of said vertical sync signal marking completion of said image frame, said time being dependent upon the output of said judging means.

18. The imaging apparatus of claim 17 wherein said time of initiation of a shutter closing operation is earlier than but closer to said vertical sync pulse marking completion of the image frame when the output of the judging means is at a first condition and is earlier than and further removed from said vertical sync pulse marking completion of said image frame when the output of the judging means is at a second condition.

19. The imaging apparatus according to claim 1, wherein:

the operating condition judging means monitors as an operating condition of the imaging apparatus at least two of ambient temperature, a posture of the imaging apparatus, power supply voltage level and a number of times of operation of the shutter means.

* * * * *

UNITED STATES PATENT AND TRADEMARK OFFICE
CERTIFICATE OF CORRECTION

PATENT NO. : 6,812,965 B1
DATED : November 2, 2004
INVENTOR(S) : Kijima et al.

It is certified that error appears in the above-identified patent and that said Letters Patent is hereby corrected as shown below:

Column 8,
Line 57, after the phrase "stop member", delete the number "65".

Column 9,
Line 10, delete the word "fix" and insert therefor -- fixed --.

Column 10,
Line 3, after the word "according", insert -- to --.

Column 15,
Line 25, delete the word "grater",

Column 16,
Line 57, after the word "after", delete "to".

Signed and Sealed this

Twenty-second Day of March, 2005

JON W. DUDAS
*Director of the United States Patent and Trademark Office*